Figure 1:
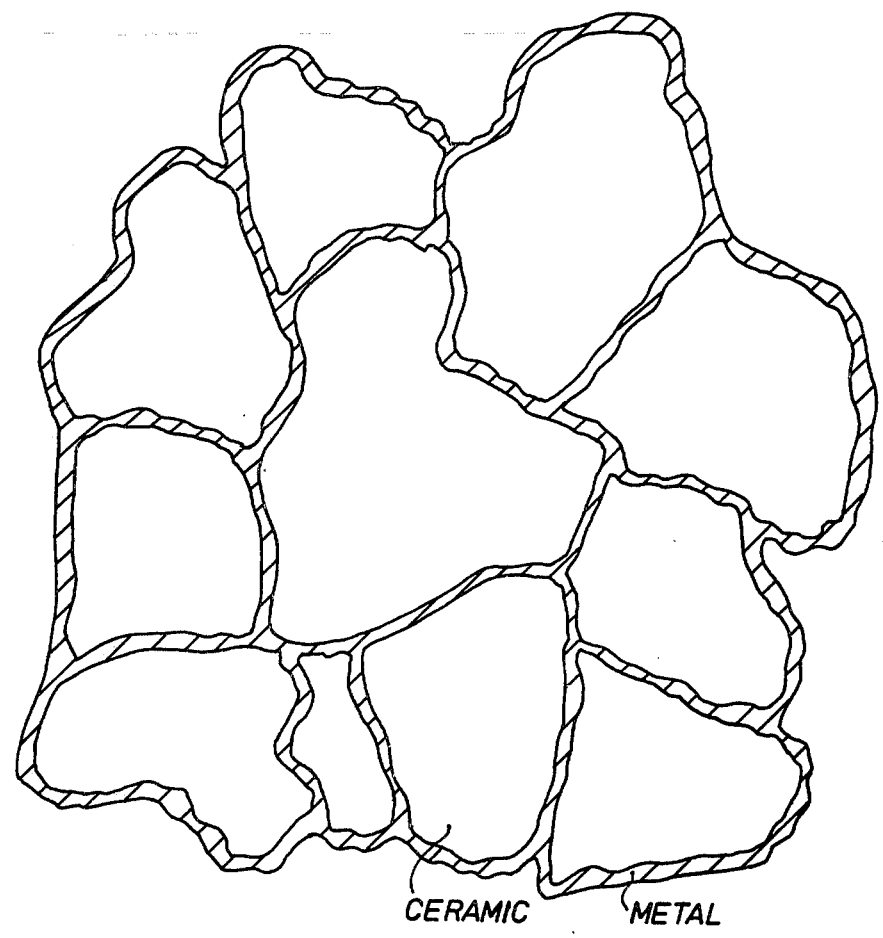

United States Patent [19]

Pearce et al.

[11] 4,183,746

[45] Jan. 15, 1980

[54] CERMETS

[75] Inventors: Stephen L. Pearce; Gordon L. Selman, both of London, England

[73] Assignee: Johnson, Matthey & Co., Limited, London, England

[21] Appl. No.: 752,791

[22] Filed: Dec. 20, 1976

[30] Foreign Application Priority Data

Dec. 24, 1975 [GB] United Kingdom ............... 52806/75

[51] Int. Cl.$^2$ ............................................. C22C 32/00
[52] U.S. Cl. ........................................ 75/234; 75/232; 75/235; 75/246; 75/212
[58] Field of Search .................. 106/39.5, 43, 44, 73.4, 106/73.5; 75/203, 204, 205, 212, 232, 234, 235, 246; 428/570

[56] References Cited

U.S. PATENT DOCUMENTS

| | | | |
|---|---|---|---|
| 1,848,438 | 3/1932 | Sieger et al. | 75/204 |
| 2,131,994 | 10/1938 | Hensel | 75/204 |
| 2,371,211 | 3/1945 | Barrington | 106/44 |
| 2,768,099 | 10/1956 | Hoyer | 75/203 |
| 3,482,950 | 12/1969 | Kosco | 75/204 |
| 3,623,849 | 11/1971 | Benjamin | 75/205 |
| 3,709,667 | 1/1973 | Selman et al. | 75/235 |
| 3,752,655 | 8/1973 | Ramqvist | 106/43 |
| 3,969,553 | 7/1976 | Kondo et al. | 75/205 |

*Primary Examiner*—L. Dewayne Rutledge
*Assistant Examiner*—John P. Sheehan
*Attorney, Agent, or Firm*—Cushman, Darby & Cushman

[57] ABSTRACT

This invention relates to intimate mixtures of ceramic materials and metals, usually referred to as cermets. A cermet of the invention comprises a first phase of ceramic particles and a second phase of a metallic material wherein at least a major proportion of the particles have their surfaces treated with an additive which forms a material capable of bonding together the materials of the first and second phase. The metallic phase may be gold, silver or a platinum group metal. The ceramic phase may be a refractory oxide of alumina and the additive is derived from at least one of the metals yttrium, aluminium, titanium, vanadium, chromium and nickel.

The cermet materials of this invention are particularly useful in the manufacture of erosion resistant components used in glass making operations and in the electrical industry.

8 Claims, 2 Drawing Figures

CERAMIC   METAL

CERMETS

This invention relates to intimate mixtures of ceramic materials and metals, usually known as cermets, and the preparation thereof.

It is well known in the art that mixtures of ceramics and metals can possess desirable properties not manifest by either constituent individually. For example ceramics are brittle but are not normally affected by exposure to oxidising conditions, whereas metals are characterised by strength and ductility but frequently have poor oxidation resistance. In combination, the mixture or cermet if properly compounded may possess only the desirable properties, i.e. the strength and ductility associated with the metal phase whilst simultaneously demonstrating the good oxidation resistance of the ceramic.

In the preparation of cermets it is the normal practice to prepare a powder mixture of the components, followed by pressing and sintering to the desired shape. Alternatively the ceramic may be formed as a porous mass, and liquid metal subsequently infiltrated into the pores. Many combinations of metal and alloys with oxide or other ceramics have been considered in the past and have been the subject of experiment. The products have exhibited a wide variety of properties, and a few have found practical utility.

According to a first aspect of the invention, a cermet comprises a first phase of ceramic particles and a second phase of a metallic material wherein at least a major proportion of the particles have their surfaces treated with an additive which forms a material capable of bonding together the materials of the first and second phases.

According to a second aspect of the invention, a cermet comprises a first phase of ceramic particles and a second phase of a metallic material wherein at least a major proportion of the particles have their surfaces treated with an additive selected to form a solid solution with the materials of the first and with the second phases and wherein the material of the second phase constitutes a skeletal lattice structure encapsulating the so-treated ceramic particles.

The metallic material of the second phase may be a precious metal such as gold, silver, a platinum group metal (i.e. ruthenium, rhodium, palladium, osinium, iridium and platinum) or an alloy containing any one or more of the said metals. Conveniently, the ceramic material is a high melting point refractory oxide, carbide or nitride such as alumina, but other ceramic materials may be used such as "Mullite"—a mixture of magnesia, silicate and alumina, silicon carbide, silicon nitride. The ceramic material may include one or more refractory oxides, carbides or nitrides having a melting point greater than that of the metallic material of the second phase. In a preferred aspect, the melting point of the cermet material is greater than 2000° C. when the metallic phase is platinum, rhodium or ruthenium.

In many applications of cermets, the distribution of metallic and non-metallic phases is not critical. It is, however, a feature of the present invention to produce a cermet in which the metallic phase forms a strong bond with the ceramic particles.

The invention also includes a method of making a cermet as described above comprising forming a solution of the ceramic particles and an additive which forms a solid solution with the ceramic and the metallic phases, agitating and evaporating the solution to dryness to form a particulate mass and, thereafter, applying a coating of the metal of the metallic phase to the particles to form a substantially continuous skeletal lattice structure which encapsulates the particles. Preferably, in the case of particles of platinum, rhodium or iridium the additive is chromium nitrate.

Although the invention will be described with particular reference to a platinum-alumina cermet, it is not intended to be exclusive—other precious metals, in particular those of the platinum group and other refractory ceramics, are capable of being processed in a similar fashion. A particular advantage of the use of a platinum metal in a cermet is that the known superior high temperature properties compared with base metals will also be reflected in the characteristics of the cermet.

Two applications envisaged for the platinum-alumina cermet are as an erosion-resistant material in glass manufacturing operations (e.g. orifices, crucibles, bricks for lining melting tanks), or as an electrically conducting material for use in electric furnace (for example as a high frequency furnace susceptor, high load resistors, and high temperature thermometers etc.). Furnace heating elements may be made from cermet materials in the form of rods and may be used individually or in annular clusters. The use of a cermet in these applications can result in considerable economies compared with the use of platinum in metallic or alloyed form, and the cermet can also be stronger at high temperature than the metal.

The criteria required in the above mentioned applications are met by the desirable microstructure illustrated schematically in FIG. 1. From this it will be seen that each grain of the ceramic phase is completely encapsulated in a layer of platinum. The continuity of the platinum phase through the structure ensures electrical conductivity in the cermet, whilst if any of the ceramic phase, (for example an alumina particle) is exposed at the surface to attack by molten glass, then erosion of the ceramic phase will be limited by the exposure of a fresh platinum surface as soon as the ceramic is removed.

In the case of a platinum/alumina cermet, it will be appreciated that since platinum is a metal of high density compared with alumina, economies in use will result when the platinum layers shown in FIG. 1 are made as thin as possible. However, such a structure will only be stable if the junction between the metal and the oxide has a low interfacial energy, i.e. if the metal "wets" the oxide. In the processing schedule presently described this desirable state is attained by the inclusion of a carefully chosen additive which is described in more detail below.

The first stage in the preparation of an alumina-platinum cermet is the mixing of the alumina with the additive, in this case 1% $Cr(NO_3)_3$. This was carried out by adding 50 mls of a solution containing 76.9 gms per liter of chromium nitrate to 50 gms of alumina. The material was agitated until most of the liquid has evaporated, then left overnight at 100° C. By this means most of the chromium nitrate is converted to chromic oxide.

The resultant mix was sieved to remove any excessively large pieces or fine alumina particles and the fraction between 150 and 400 mesh retained for coating with platinum.

The coating of the alumina powder was carried out by a chemical deposition process. This involves treatment of the powder with a solution of either chloroplatinic acid or tetramine platinous chloride in the presence of a reducing agent, for example, hydrazine dihydrochloride.

The chloroplatinic acid, obtained as a freeze-dried powder, was dissolved in deionised water to produce a solution containing 10 g/liter of platinum. Hydrazine dihydrochloride was also dissolved in deionised water to yield a solution also containing 10 g/liter, i.e. a 1% solution.

For plating 10 g of the alumina powder prepared as above, these two solutions are then used in following proportions:

(1) 150 ml of the chloroplatinic acid solution was mixed with an equal volume of the dihydrochloride solution to give an active bath containing 5 g of platinum per liter.

(2) The 10 g of treated alumina was added to this active bath and heated to 60° C., stirring vigorously the whole time. The bath temperature was progressively raised to 75° C. over a period of 1¼ hours, to complete plating. The liquid was decanted and the powder dried. Sieving was carried out once again to remove any free platinum particles which were precipitated during the coating process.

Alternatively, the platinum may be deposited using a solution of tetramine platinous chloride which is dissolved in deionised water to produce a solution containing 20 g/liter of platinum.

The following is a description of a procedure for plating 10 g of alumina powder:

(1) 75 mls of the tetramine platinous chloride solution was heated to 60° C. and the powder added.

(2) 7.5 mls of saturated sodium hydroxide and 7.5 mls of 60% hydrazine hydrate were added and the bath stirred vigorously.

Plating was completed in 45 minutes after which the liquid was decanted and the powder dried. Sieving was carried out once again to remove any free platinum particles that have precipitated during the coating process.

With both baths thicker coatings were produced by repeating the process with another batch of active solution. When chloroplatinic acid is used the second or any subsequent coating processes is usually completed after 10–15 minutes whereas 25–30 minutes is required when tetramine platinous chloride is used. At the end of this time the liquid is decanted and either a new plating bath added or the powder dried.

The quantity of platinum used in the plating treatments was subsequently determined by the weight gain of the powder.

Typically a cermet containing 40% of platinum by weight would be produced as a result of six successive plating operations.

To consolidate the powder into a highly dense solid body with the required microstructure, hot pressing has been found to be a convenient technique. This operation was carried out in hard graphite dies. Typical processing conditions in hot pressing coated alumina powder are 1400° C., 6500 psi, for a time of 15 minutes.

A similar procedure can be used to produce rhodium/alumina cermets. An electroless plating bath was used to plate the rhodium onto $Cr(NO_3)_3$ doped alumina which was prepared in the same manner as that used for platinum/alumina cermets. The chemical deposition was achieved by adding alumina powder to a solution of sodium chlororhodite and formaldehyde.

The sodium chlororhodite was first dissolved in deionised water to produce a solution containing 20 gms/liter of rhodium. A plating bath suitable for plating 10 gms of alumina was then made as follows:

(1) 12 mls of 40% formaldehyde was added to 75 mls of the sodium chlororhodite solution to give an active bath containing 1.5 gms of rhodium.

(2) The alumina was added to the active bath and heated to 60° C. whilst stirring vigorously. After 30 minutes the plating solution was decanted and the powder washed and dried.

The quantity of rhodium used in such plating treatments was, subsequently, determined by the weight gain of the powder.

Typically, a cermet containing 40% rhodium by weight would be produced as a result of six successive plating operations.

Hot pressing in graphite dies has been found to be a convenient method of compacting these powders. Typical processing conditions in hot pressing coated alumina powder are 1400° C., 6500 psi for a time of 15 minutes.

It is a feature of such a layered system that combinations of rhodium and platinum can be applied to alumina.

EXAMPLE 1

Figure 2:
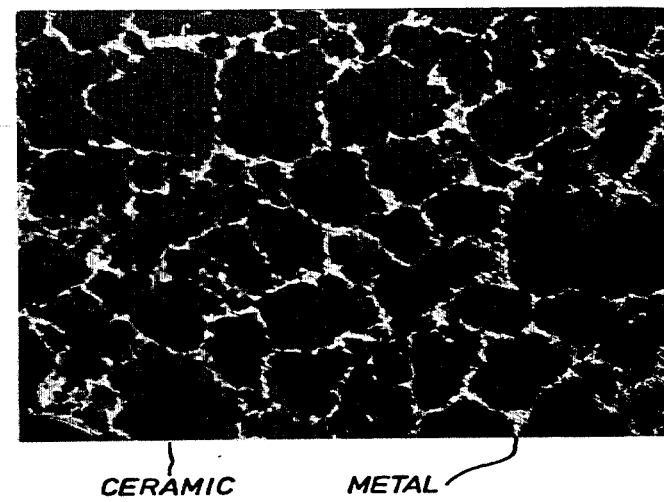

A cermet of platinum and alumina prepared by the method described above was given six successive plating treatments to yield the microstructure shown in FIG. 2. The material contains 12½% by volume (44% by weight) of platinum which forms the light coloured continuous network visible in FIG. 2.

To assess the thermal stability of the material, a pellet ½" diameter×¼" high was heated at 1300° C. for 14 days in air. Reexamination of the microstructure after this period failed to reveal any noticeable change in the network.

A further sample was maintained at 1400° C. for 82 days. Examination of this material also failed to reveal any noticeable change in the network.

EXAMPLE 2

A hot pressed pellet ½"×¼" containing 12% by volume (42% by weight) of platinum was exposed to the vapour from a borate glass at 1250° C. for 14 days. The subsequent examination of the microstructure of a cross-section of the pellet demonstrated that no penetration of the cermet structure by the glass vapour had occurred, i.e. that the cermet had excellent resistance to attack by the volatile constituents in the molten glass.

EXAMPLE 3

In many applications it is highly desirable if not essential that cermet materials should have good resistance to sudden and frequent changes of temperature. A pellet of composition and dimensions as in Example 1, was subjected to repeated heating and cooling between 1300° C. and 600° C. The total thermal cycle time was 24 secs. involving 12 secs. of heating in a high frequency coil and 12 secs. cooling in an air blast. After 13,780 cycles the sample had suffered no deterioration and the test was discontinued.

EXAMPLE 4

A current was passed through a hot pressed bar 2" long×¼" diameter containing 12% by volume (42% by weight) platinum. Electrical contact between the rod and water cooled bus bars was obtained by the use of platinum ink. Under these conditions the total resistance between the copper blocks was found to vary between 0.017Ω with the centre of the bar at approximately 850° C. and 0.021Ω with the centre of the bar at 1100° C.

The process described above has been concerned with microstructures that are essentially equiaxed in their nature. However, special applications may require the formulation of other structures, for example, lamellar or fibrous, and would be produced by a similar method.

Examples of additives used in the production of cermets according to the invention include ythrium, aluminium, titanium, vanadium chromium and nickel and the following table is a list of phase/additive combinations:

| Phases in Cermet | Additive |
| --- | --- |
| Platinum in magnesia | Nickel nitrate |
| Palladium/rhodium in alumina | Chromium or alumina nitrate |
| Platinum in zirconia | Titanium hydride |

What we claim is:

1. A cermet comprising a first phase of ceramic particles and a second phase of a metallic material wherein at least a major proportion of the particles have their surfaces coated with an additive which bonds together the materials of the first and second phases, said ceramic particles comprising one or more refractory oxides having a melting point greater than that of the metallic material of the second phase, the metallic material comprising gold, silver, ruthenium, rhodium, palladium, osmium, iridium or platinum and the additive comprising at least one member of the group consisting of yttrium, aluminum, titanium, vanadium, chromium and nickel in elemental or compound form.

2. A cermet comprising a first phase of ceramic particles and a second phase of a metallic material wherein at least a major proportion of the particles have their surfaces coated with an additive selected to form a solid solution with the materials of the first and with the second phases and wherein the material of the second phase constitutes a skeletal lattice structure encapsulating the so-treated ceramic particles, said ceramic particles comprising one or more refractory oxides having a melting point greater than that of the metallic material of the second phase, the metallic material comprising gold, silver, ruthenium, rhodium, palladium, osmium, iridium or platinum and the additive comprising at least one member of the group consisting of yttrium, aluminum, titanium, vanadium, chromium and nickel in elemental or compound form.

3. A cermet according to claim 1 wherein the ceramic material is alumina, magnesia, zirconia.

4. A cermet according to claim 1 wherein the metallic phase comprises at least one of the metals platinum, rhodium and iridium and wherein the additive comprises chromium nitrate.

5. A cermet according to claim 1 wherein the ceramic phase is magnesia, the metallic phase is platinum and the additive is nickel nitrate.

6. A cermet according to claim 1 wherein the ceramic phase is alumina, the metallic phase is an alloy of palladium and rhodium and the additive is chromium nitrate or alumina nitrate.

7. A cermet according to claim 1 wherein the ceramic phase is zirconia, the metallic phase is platinum and the additive is titanium hydride.

8. A cermet according to claim 1 wherein the melting point of the ceramic material is greater than 2000° C. when the metallic phase is platinum, palladium, rhodium or ruthenium.

* * * * *